(12) United States Patent
Crater et al.

(10) Patent No.: US 6,571,362 B1
(45) Date of Patent: May 27, 2003

(54) METHOD AND SYSTEM OF REFORMATTING DATA BLOCKS FOR STORAGE AS LARGER SIZE DATA BLOCKS

(75) Inventors: Michael Richard Crater, Arvada, CO (US); Steven Christopher Fraioli, Arvada, CO (US); Jim Lloyd Mechalke, Jr., Longmont, CO (US)

(73) Assignee: Storage Technology Corporation, Louisville, CO (US)

( * ) Notice: Subject to any disclaimer, the term of this patent is extended or adjusted under 35 U.S.C. 154(b) by 256 days.

(21) Appl. No.: 09/603,401

(22) Filed: Jun. 26, 2000

(51) Int. Cl.[7] ................................................ G06F 11/00
(52) U.S. Cl. ...................................... 714/701; 714/702
(58) Field of Search ................................. 714/701, 702, 714/763

(56) References Cited

U.S. PATENT DOCUMENTS

| | | | | |
|---|---|---|---|---|
| 5,490,260 A | * | 2/1996 | Miller et al. ................. | 714/701 |
| 5,887,199 A | | 3/1999 | Ofer et al. | |
| 5,898,698 A | * | 4/1999 | Bross .......................... | 714/701 |

FOREIGN PATENT DOCUMENTS

WO    WO 00/02121 A1    1/2000

* cited by examiner

*Primary Examiner*—Phung M. Chung
(74) *Attorney, Agent, or Firm*—Brooks & Kushman P.C.

(57) ABSTRACT

A method and system are provided for improving efficiency of storing and accessing data blocks for systems that are limited to small size, host accessible data blocks, such as having a maximum size of 512 bytes, by allowing larger size subsystem data blocks to be created from the smaller size logical data blocks. A host command is analyzed to determine whether the host accessible logical data block aligns with the larger subsystem block. If so, the larger block(s) is(are) sent to the host. If the command does not align, the larger block is processed into a plurality of segments so that the addressed data block(s) can be aligned, and any error correction coding verified. The present invention allows a subsystem to store and manage efficiently sized blocks of data while still supporting a host's need to access smaller, single architecturally defined addressable blocks. The present invention is particularly suited for use with storage architectures arranged to compress data and add CRC redundancy codes, such as a shared virtual array (SVA) architecture.

13 Claims, 3 Drawing Sheets

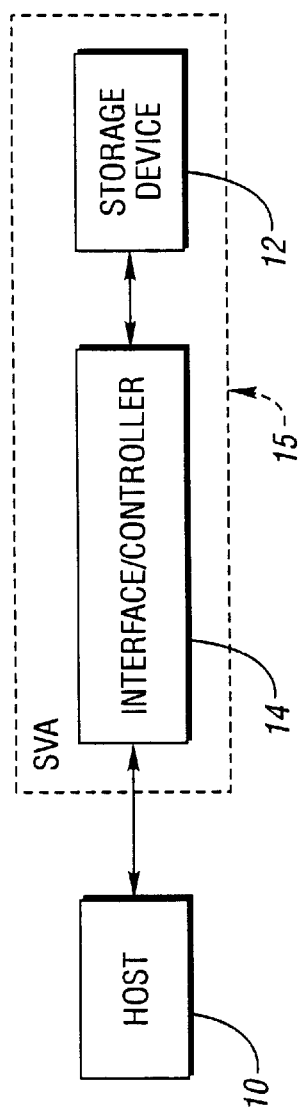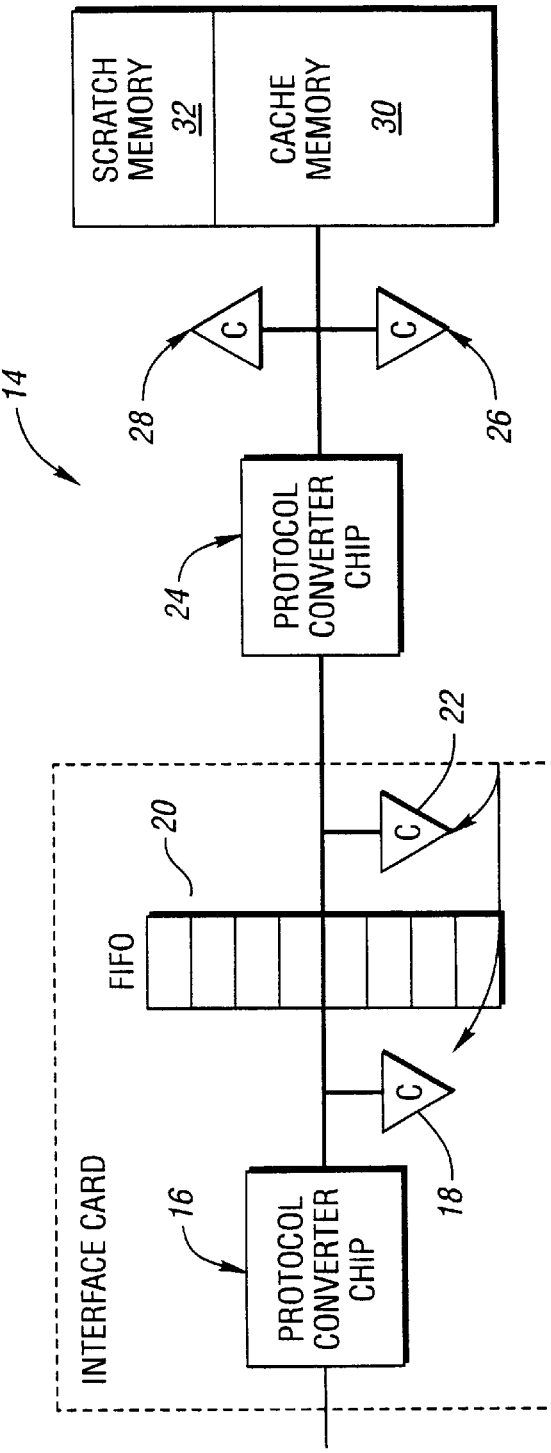

METHOD AND SYSTEM OF REFORMATTING DATA BLOCKS FOR STORAGE AS LARGER SIZE DATA BLOCKS

TECHNICAL FIELD

The present invention relates to processing of data blocks for storage and retrieval from a open system data storage device, and more particularly, to an improved arrangement for processing of data blocks to accommodate data compression, CRC redundancy codes, and encryption in such an open system architecture.

BACKGROUND ART

An open systems environment, i.e., a system capable of operating without a specified device driver, can provide system flexibility by accommodating connection to different, unspecified data storage devices. However, without a vendor specific device driver, devices presented for use on an open systems host must be formatted with a logical block size of 512 bytes. In other words, if the blocks are larger than 512 bytes, the operating system will not recognize the device and bring it online. When executing reads and writes to the device the operating system will generally move data based upon an allocation size defined at the time that the file system was placed on the device. Depending, on the structure and size of file being accessed, a host may request a block of data smaller than the file system allocation size. The smallest request that can be made is for the read or write of a single logical block, i.e., 512 bytes.

The target device wants to store data in larger blocks than the logical block size of 512 bytes. This allows for more efficient utilization of the device data paths, buffers and management structures, and improvement in overall performance. More specifically, the performance problem associated with storing the data in block sizes of 512 bytes derives from the need for a high amount of processing overhead to move from one block to the next within a single read or write operation. Because of such overhead requirements, it is not uncommon for devices to access larger blocks of data from the physical media and return or update only those portions addressed by the host.

In a storage subsystem like a Shared Virtual Array (SVA), the problem of reading or writing a portion of a larger data block is accentuated by the architecture of the subsystem as a result of the data being stored in a compressed format and including several CRC redundancy codes over the data block. The CRC redundancy codes are used to maintain data integrity within the control unit, and are generated and appended to the data as it is received from the host. The compression of data is an enhancement which allows a greater effective bandwidth and physical media utilization for the control unit and disk array. In order to allow the addressability of a single 512 byte logical block, the data is stored on the array in compressed 512 byte blocks so that the interface card is able to check and generate the CRC code for the single block being accessed.

However, storing of data blocks in small, host accessible sizes significantly reduces storage subsystem efficiency through increased overhead and data processing time. As such, a need exists for an arrangement capable of improved efficiency in storing and accessing of such data blocks which still supports handling of the data in its original, host accessible block size, as well as any original compression and error correction coding.

DISCLOSURE OF INVENTION

It is therefore an object of the present invention to provide a method and system of storing and accessing host addressable logical blocks within a larger subsystem data block.

In accordance with this and other objects, the present invention provides a method of storing and accessing data on a storage device in data blocks having a larger size than an original logical data block formatted on a host system. The method includes receiving a plurality of original logical data blocks from the host, reformatting the data of the logical data blocks into data blocks having a larger block size, and maintaining a record of the location within a larger data block of each reformatted original logical data block. Accessing the data includes receiving a data command from the host system, determining if the data command aligns with boundaries of the reformatted, larger size data block, and for nonaligning commands, processing the larger data block in segments to align the data transfer to allow the subportion of data relating to the host command to be accessed from the larger block.

In accordance with another aspect of the present invention, a system is provided for controlling storing and accessing of data on a storage device in data blocks having a larger size than an original logical data block formatted on a host system, wherein the system includes an interface circuit arranged to receive a plurality of original logical data blocks from the host, and a controller arranged to reformat the data of the logical data blocks into data blocks having a larger block size, and maintain a record of the location within a larger data block of each reformatted original logical data block. The controller is further arranged to control accessing of the data in response to receiving a data command from the host system, including determining if the data command aligns with boundaries of the reformatted, larger size data block, and for nonaligning commands, processing the larger data block in segments to align the data transfer to allow the subportion of data relating to the host command to be accessed from the larger block.

The above object and other objects, features and advantages of the present invention are more readily understood from a review of the attached drawings and the accompanying specification and claims.

BRIEF DESCRIPTION OF DRAWINGS

FIG. 1 is a block diagram of an open system storage array data path in accordance with one embodiment of the present invention;

FIG. 2 is a block diagram representing a portion of the data path in a data storage subsystem in accordance with the present invention;

BEST MODE FOR CARRYING OUT THE INVENTION

Figure 3:
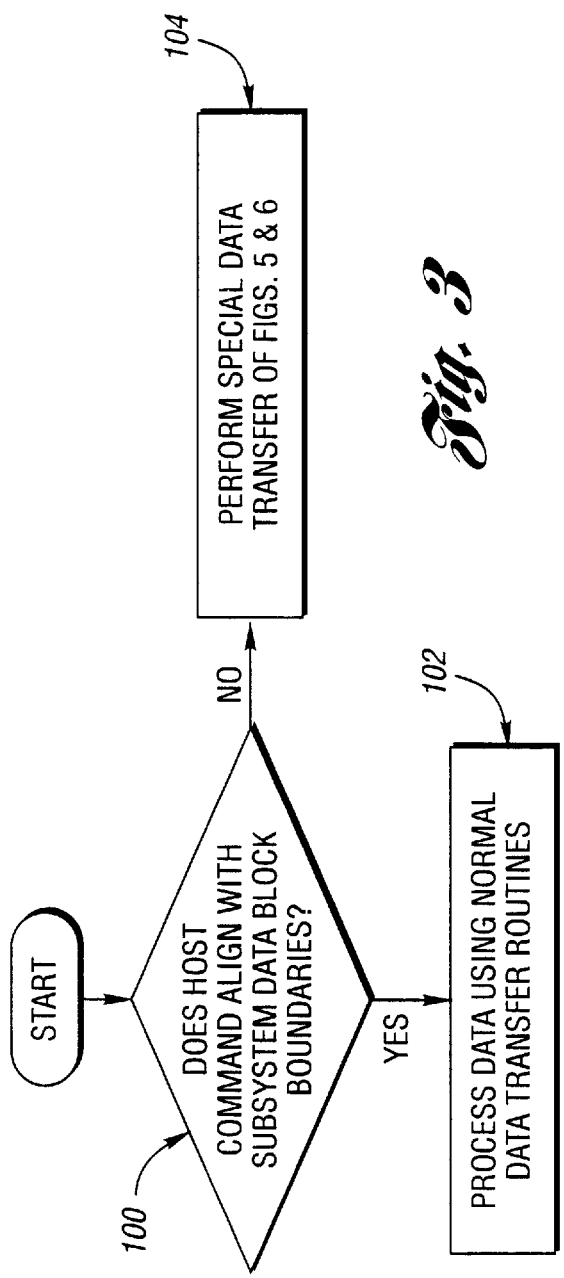
FIG. 3 is flow chart showing basic operation of the data accessing arrangement of the present invention.

The present invention provides a method and system of efficiently storing and accessing data blocks that overcomes the above-noted deficiencies of data storage systems that are limited to small size, host accessible data blocks, such as 512 bytes, by allowing larger size subsystem data blocks to be created from the smaller size logical data blocks, and subsequent accessing of the host addressable logical blocks within the larger size subsystem data block. An example of such a data storage system having limited size host accessible data blocks is an open system type architecture. As described below, the present invention allows a subsystem to store and manage efficiently sized blocks of data while still supporting a host's need to access smaller, single architecturally defined addressable blocks. The present invention is particularly suited for use with storage architectures arranged to compress data and add CRC redundancy codes, such as a shared virtual array (SVA) architecture, and can also accommodate encryption of the data.

As shown in FIG. 1, a storage system includes at least one host 10 connected to a storage device 12 via a microprocessor based interface/subsystem controller 14. As denoted by box 15, storage device 12 and interface controller 14 can form part of the same subsystem, such an SVA, or alternatively form separate elements within the open system architecture. As shown in FIG. 2, the interface/subsystem controller 14 includes a protocol convertor chip/circuit 16 connected to receive and send data blocks to the host, and a first CRC redundancy code generator and checker 18 coupled between protocol convertor 16 and a first-in-first-out (FIFO) register 20. A second CRC generator/checker 22 is coupled between FIFO register 20 and a second protocol converter chip/circuit 24. A third CRC generator/checker 26 and secondary CRC checker 28 are connected between protocol converter 24 and a cache memory 30. A portion of the cache memory can be dedicated for use as a scratch memory 32, or a separate scratch memory unit can be provided. A separate scratch memory can be contained either on the interface, or elsewhere within the subsystem.

In one embodiment of the present invention, the subsystem supports host addressable logical block sizes of 512 bytes on a storage device, while the subsystem controller is arranged to reformat the host data blocks into larger SVA data blocks, such as a 4096 byte addressable boundary. The controller is arranged to repackage the host data blocks into the larger size SVA blocks, and maintain a record of the location of particular host data blocks within the SVA blocks for later access as described below.

Figure 4:
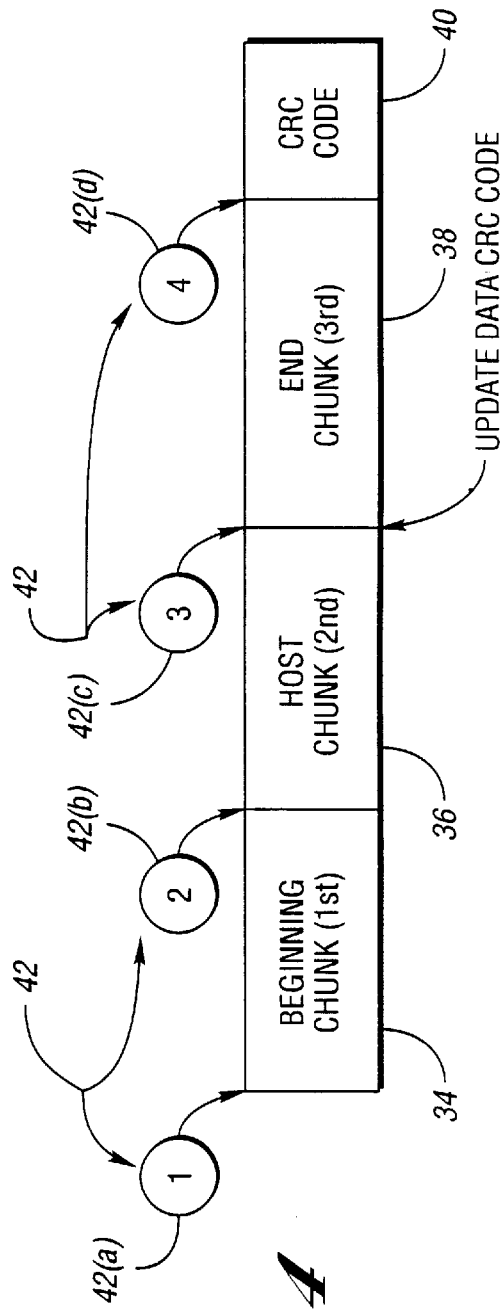
FIG. 4 is a block diagram of a data block representing processing of an subsystem data block in nonalignment situation.

The overall operation of the present invention is summarized in the flow chart of FIG. 3. In accordance with the present invention, when the host executes a read or write operation that transfers a set of logical blocks of data in multiples of the SVA 4096 block size, the controller will move whole SVA blocks over the interface to the host. More specifically, at block 100, when a command is received from a host, it is decoded to determine if the command aligns to the SVA block size. As denoted at block 102, if the host logical block address lines up on a SVA block boundary, and the number of logical host blocks is a modulus of the SVA block size, then normal data transfer routines are executed. However, if the data does not align, i.e, the boundaries of the host data block(s) do not match the SVA block boundary, a special data transfer routine is executed at block 104 to decompress the SVA block and align the data transfer to allow the addressed/requested subportion of data to be accessed from the larger SVA block. The special data transfer routine for read operations is described in context with FIGS. 4 and 5, while the special transfer routine for a write operation is described in context with FIGS. 4 and 6.

Figure 5:
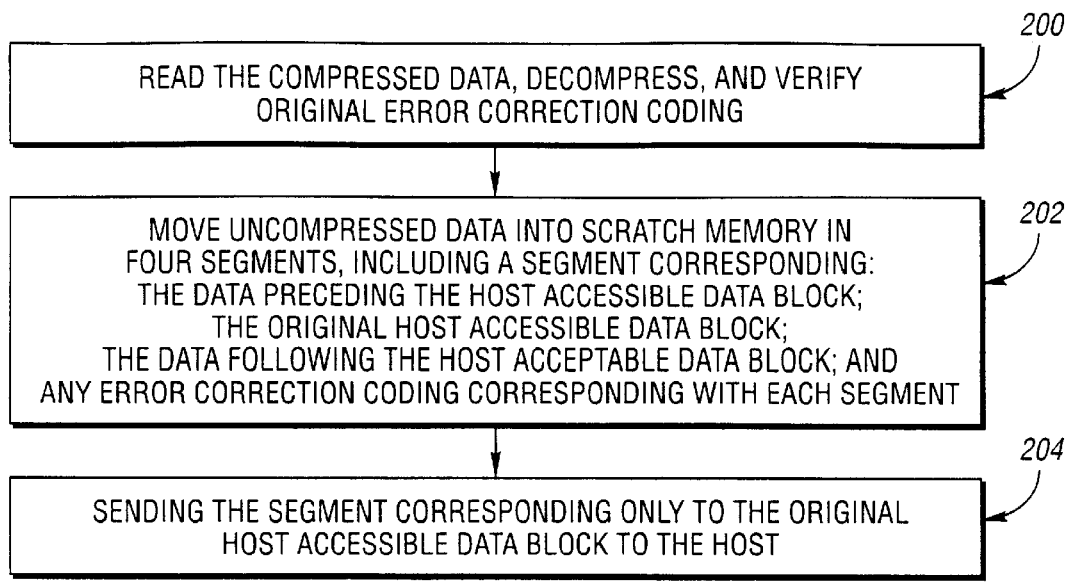
FIG. 5 is a flow chart showing processing of a subsystem data block for nonaligning read operations in accordance with the present invention.

More specifically, for nonaligning read operations, as denoted at block 200 in FIG. 5, the original compressed data block is read from memory, decompressed, and the original ending CRC code is checked and stored. The data is then stored in the interface FIFO. At block 202, the uncompressed data/record is then moved to scratch memory location in at least four different segments. The first segment 34 corresponds to the beginning portion of the SVA block not addressed by host. The length of this segment may be 0 bytes. A second segment 36 corresponds to the host addressed portion of the SVA block. The third segment 38 corresponds to the end portion of the SVA data block not addressed by the host. Like the first segment, the length of this segment may be 0 bytes. The fourth segment 40 corresponds to the CRC redundancy code of the SVA data block. All intermediate CRC codes, denoted as 42(a)–42(d), are saved along with segment 40 for use in data integrity verification in subsequent steps.

As denoted at block 204, the second segment is read from the scratch memory over a channel interface to the host. The data is transferred in uncompressed format. CRC redundancy code corresponding to the data sent to the host is then generated. The generation seed is based on intermediate CRC code 42(b). The generated CRC code is then checked against intermediate CRC code 42(c) saved during the transfer of segment 36 in block 202.

Figure 6:
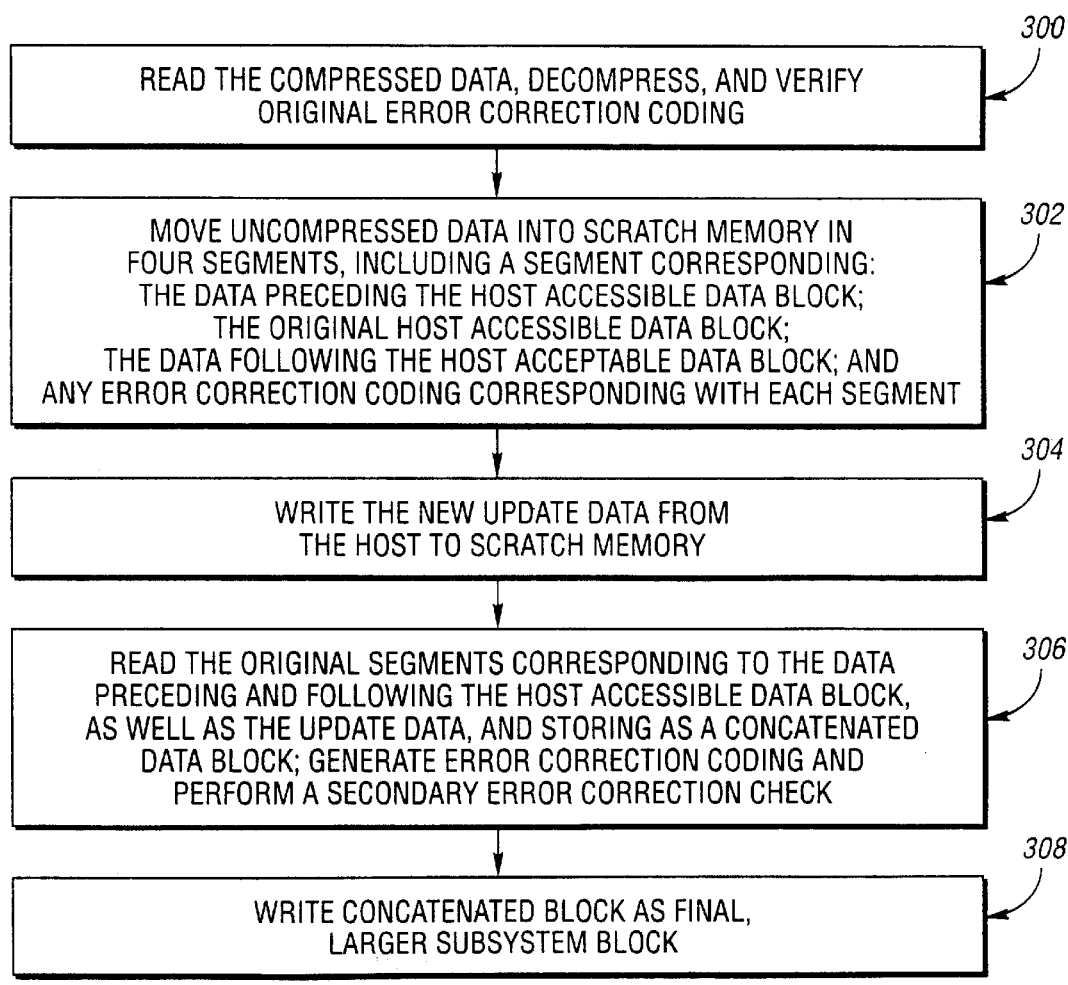
FIG. 6 is a flow chart showing processing of a subsystem data block for nonaligning write operations in accordance with the present invention.

For nonalignment write situations, as denoted at block 300 in FIG. 6, the original compressed data block is read, decompressed, and the original ending CRC code is checked/verified. The data is then stored in the interface FIFO. At block 302, the uncompressed data/record is moved to scratch memory location in at least four segments. As described above in connection with the nonaligned read operation and FIG. 4, the first segment 34 corresponds to the beginning portion of the SVA block not addressed by host. The length of this segment may be 0 bytes. A second segment 36 corresponds to the host addressed portion of the SVA block. The third segment 38 corresponds to the end portion of the SVA data block not addressed by the host. Like the first segment, the length of this segment may be 0 bytes. The fourth segment 40 corresponds to the CRC redundancy code of the SVA data block. All intermediate CRC codes, denoted as 42(a)–42(d), are saved along with segment 40 for use in data integrity verification in subsequent steps.

As denoted at block 304, the new update data is written from the host to update the data located in the scratch memory. Data is received from the host in uncompressed format. All update data CRC redundancy code are saved for subsequent use. The seed for the update data CRC code is based on intermediate CRC code 42(b).

At block 306, three segments of uncompressed data are then read from scratch memory and stored in the interface FIFO. The three segments consist of the original first segment, the update data from the host, and the original third segment. A CRC redundancy code is generated over the concatenated data segments. Secondary CRC redundancy check circuit is then used to perform a check of the CRC redundancy code corresponding to each of the three segments against the CRC codes saved in blocks 302 and 304.

At block 308, the final, larger SVA data block is then written to the subsystem cache memory, and ultimately the disk array/storage device. The writing process can include compressing the data for the whole block as if received entirely as a block from the host.

Thus the present invention provides an arrangement capable of storing the data on a subsystem in a larger block format than used by a host. This provides a significant improvement in overall performance, such as a 400% improvement in environments where host read or write operations transfer a plurality of data blocks having an overall length of 64K bytes. In addition to improved performance, other improvements are realized from the use of larger data blocks in the subsystem. For example, data block sizes of 4096 bytes allows doubling of virtual track capacity from 48 logical 512 byte records to 96 logical 512 byte records. This results in halving the cost per megabyte value of storage. This results in a value added feature by lowering the customer's total cost of ownership while increasing potential profit margin. In addition, overhead due to switching from track to track is reduced since there are fewer track switches as a result of the higher quantity of data stored per track. Another potential advantage is an increase in the data compression ratio as a result of the increase in data set size and corresponding history table. Still further, better utilization of cache hardware bandwidth is realized by storing data in larger blocks. One known design of a SVA cache includes a packetized bus having a size that is dependent on the amount of data being transferred. Managing data with a larger block size, such as 4096 bytes, allows maximizing of packet size to produce a cost of arbitration and header overhead of 20% of raw bandwidth. Data managed in 512 byte blocks typically increases overhead by 40% of raw bandwidth, thus reducing the ability of the subsystem to move large amounts of data efficiently.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of storing and accessing data on a storage device in data blocks having a larger size than an original logical data block formatted on a host system, the method comprising:

receiving a plurality of original logical data blocks from the host;

reformatting the data of the logical data blocks into data blocks having a larger block size; and maintaining a record of the location within a larger data block of each reformatted original logical data block, wherein accessing the data comprises:

receiving a data command from the host system;

determining if the data command aligns with boundaries of the reformatted, larger size data block; and for nonaligning commands, processing the larger data block in segments to align the data transfer to allow a subportion of data relating to the host command to be accessed from the larger block.

2. The method of claim 1 wherein the data from the host includes an error checking code associated with each original logical block, and processing of the larger data block in segment includes performing error checks based on the error checking code received with the original logical data block.

3. The method of claim 1 wherein processing the larger data block in segments comprises partitioning the larger data block in at least a segment comprising the data corresponding to the host command, a segment comprising any data in the larger data block preceding the data corresponding to the host command, and a segment comprising any data in the larger data block following the data corresponding to the host command.

4. The method of claim 3 further comprising partitioning a segment comprising any error checking coding associated with each of the other segments.

5. The method of claim 4 wherein if the nonaligning operation is a data read operation, sending the a segment comprising the data corresponding to the host command to the host.

6. The method of claim 5 further comprising generating an error correction code corresponding to the data sent to the host, and checking the generated error correction code against an intermediate error correction code originally corresponding to that segment.

7. The method of claim 4 wherein if the nonaligning operation is a data write operation, writing any update data to update the data located in a scratch memory, and saving any error correction coding associated with the updated data.

8. The method of claim 7 further comprising reading and concatenating the original segment comprising any data in the larger data block preceding the data corresponding to the host command, the segment comprising any data in the larger data block following the data corresponding to the host command, and the update data from the host, and generating an error correction code over the concatenated data segments, wherein a secondary error check is performed based on the generated error correction code and any original, corresponding error correction code, and writing the concatenated data segments as a larger data block to a memory device.

9. The method of claim 1 wherein the data is stored on the storage device in a compressed format, and processing the data the larger data block in segments comprises decompressing the larger data block before forming the segments.

10. The method of claim 1 wherein if the host command does align with the larger data block, the data is sent to the host in the larger data block format.

11. The method of claim 1 wherein the data is stored on the storage device in a compressed format, and if the host command does align with the larger data block, the data is decompressed and sent to the host in the larger data block format.

12. A system for controlling storing and accessing data on a storage device in data blocks having a larger size than an original logical data block formatted on a host system, the system comprising:

an interface circuit arranged to receive a plurality of original logical data blocks from the host;

a controller arranged to reformat the data of the logical data blocks into data blocks having a larger block size, and maintain a record of the location within a larger data block of each reformatted original logical data block, wherein the controller is further arranged to control accessing of the data in response to receiving a data command from the host system, including determining if the data command aligns with boundaries of the reformatted, larger size data block, and for nonaligning commands, processing the larger data block in segments to align the data transfer to allow a subportion of data relating to the host command to be accessed from the larger block.

13. A method of storing and accessing data on a storage device in data blocks having a larger size than an original logical data block formatted on a host system, the method comprising:

receiving a plurality of original logical data blocks from the host;

concatenating the data of the logical data blocks into data blocks having a larger block size; and maintaining a record of the location within a larger data block of each concatenated original logical data block, wherein accessing the data comprises:
receiving a data command from the host system;
determining if the data command aligns with boundaries of the concatenated, larger size data block; and
for nonaligning commands, processing the larger data block in segments to align the data transfer to allow a subportion of data relating to the host command to be accessed from the larger block.

* * * * *